(12) United States Patent
Kim et al.

(10) Patent No.: US 8,254,507 B2
(45) Date of Patent: Aug. 28, 2012

(54) METHOD AND SYSTEM FOR SFBC/STBC IN A COMMUNICATION DIVERSITY SYSTEM USING ANGLE FEEDBACK

(75) Inventors: Joonsuk Kim, San Jose, CA (US); Sirikiat Ariyavisitakul, Alpharetta, GA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 972 days.

(21) Appl. No.: 11/864,611

(22) Filed: Sep. 28, 2007

(65) Prior Publication Data
US 2008/0311873 A1 Dec. 18, 2008

Related U.S. Application Data

(60) Provisional application No. 60/944,639, filed on Jun. 18, 2007.

(51) Int. Cl.
*H04B 7/10* (2006.01)
(52) U.S. Cl. .......... 375/347; 375/316; 375/267
(58) Field of Classification Search .......... 375/347
See application file for complete search history.

(56) References Cited

U.S. PATENT DOCUMENTS

| | | | |
|---|---|---|---|
| 6,747,946 B1 * | 6/2004 | Kaneko et al. | 370/206 |
| 6,996,375 B2 * | 2/2006 | Dent et al. | 455/67.16 |
| 7,418,050 B1 * | 8/2008 | Gardner et al. | 375/265 |
| 7,483,675 B2 * | 1/2009 | Kent et al. | 455/67.11 |
| 7,558,330 B2 * | 7/2009 | Hafeez | 375/267 |
| 7,676,007 B1 * | 3/2010 | Choi et al. | 375/347 |
| 7,724,804 B2 * | 5/2010 | Yamasuge | 375/136 |
| 7,782,969 B2 * | 8/2010 | Aoki et al. | 375/260 |
| 7,961,591 B2 * | 6/2011 | Abedi | 370/208 |
| 2004/0142714 A1 * | 7/2004 | Viswanath et al. | 455/517 |
| 2004/0203468 A1 * | 10/2004 | Dent et al. | 455/67.14 |
| 2005/0054931 A1 * | 3/2005 | Clark | 600/453 |
| 2005/0190821 A1 * | 9/2005 | Fujii et al. | 375/211 |
| 2005/0265479 A1 * | 12/2005 | Fujii et al. | 375/303 |
| 2006/0039489 A1 * | 2/2006 | Ikram et al. | 375/260 |
| 2006/0078066 A1 * | 4/2006 | Yun et al. | 375/299 |
| 2006/0109938 A1 * | 5/2006 | Challa et al. | 375/347 |
| 2006/0209979 A1 * | 9/2006 | Sandell et al. | 375/267 |
| 2006/0227891 A1 * | 10/2006 | Niu et al. | 375/267 |
| 2007/0098097 A1 * | 5/2007 | Khan et al. | 375/260 |
| 2007/0104163 A1 * | 5/2007 | Kim | 370/338 |
| 2007/0104288 A1 * | 5/2007 | Kim | 375/267 |

(Continued)

FOREIGN PATENT DOCUMENTS
EP 1 076 425 A2 2/2001

*Primary Examiner* — David Ometz
*Assistant Examiner* — Santiago Garcia
(74) *Attorney, Agent, or Firm* — Garlick & Markison

(57) ABSTRACT

Aspects of a system for STBC/SFBC in a communication system using angle feedback may include a receiver, which enables reception of signals via a plurality of receiving antennas. The receiver may enable computation of a rotation factor value based on the received signals and utilization of the computed rotation factor value to receive subsequent signals via the plurality of receiving antennas. The received signals may comprise preamble data. The receiver may enable computation of channel estimate values based on the received preamble data. A rotation angle value may be computed based on the computed channel estimate values. The rotation factor value may be computed based on the computed rotation angle value. The receiver may enable transmission of feedback information comprising the computed rotation factor and/or the computed rotation angle.

20 Claims, 9 Drawing Sheets

U.S. PATENT DOCUMENTS

| | | | |
|---|---|---|---|
| 2007/0160011 A1* | 7/2007 | Kim et al. | 370/332 |
| 2007/0198623 A1* | 8/2007 | Karino | 708/404 |
| 2007/0213013 A1* | 9/2007 | Kim | 455/69 |
| 2008/0247873 A1* | 10/2008 | Egedal | 416/43 |
| 2009/0080566 A1* | 3/2009 | Tong et al. | 375/299 |
| 2009/0124210 A1* | 5/2009 | Imai et al. | 455/69 |

* cited by examiner

METHOD AND SYSTEM FOR SFBC/STBC IN A COMMUNICATION DIVERSITY SYSTEM USING ANGLE FEEDBACK

CROSS-REFERENCE TO RELATED APPLICATIONS/INCORPORATION BY REFERENCE

This application makes reference to, claims priority to, and claims the benefit of U.S. Provisional Application Ser. No. 60/944,639 filed Jun. 18, 2007.

The above stated application is hereby incorporated herein by reference in its entirety.

FIELD OF THE INVENTION

Certain embodiments of the invention relate to data communication. More specifically, certain embodiments of the invention relate to a method and system for SFBC/STBC in a communication diversity system using angle feedback.

BACKGROUND OF THE INVENTION

Quasi-orthogonal space time block coding (STBC) is a method utilized in some diversity transmission systems utilized in the field of wireless communication. The appeal of quasi-orthogonal STBC is that it seeks to enable wireless communication systems to utilize advantages of diversity transmission at a transmitting station, while allowing simplified decoding techniques at a receiving station.

Diversity transmission enables one or more streams of data to be transmitted via a plurality of transmitting antennas. Diversity transmission systems are described by the number of transmitting antennas and the number of receiving antennas. For example, a diversity transmission system, which utilizes four transmitting antennas to transmit signals and a single antenna to receive signals, may be referred to as a 4×1 diversity transmission system, while a diversity transmission system, which utilizes four transmitting antennas to transmit signals and two receiving antennas to receive signals, may be referred to as a 4×2 diversity transmission system.

Each data stream may comprise a sequence of data symbols. Each data symbol comprises at least a portion of the data from the data stream. In a diversity transmission system, which utilizes orthogonal frequency division multiplexing (OFDM), each data symbol is referred to as an OFDM symbol. Each OFDM symbol may utilize a plurality of frequency carrier signals, wherein the frequencies of the carrier signals span the bandwidth of an RF channel. RF channel bandwidths may be determined, for example, based on applicable communication standards utilized in various communication systems. Exemplary RF channel bandwidths are 20 MHz and 40 MHz. One or more of the frequency carrier signals within an RF channel bandwidth may be utilized to transmit at least a portion of the data contained in the OFDM symbol. The size of each portion, as measured in bits for example, may be determined based on a constellation map. The constellation map may, in turn, be determined by a modulation type that is utilized to transport the data contained in the OFDM symbol via the RF channel.

In general, each of the data streams, which in turn comprise one or more OFDM symbols, may be referred to as a spatial stream. A diversity transmission system, which utilizes $N_{TX}$ transmitting antennas to transmit signals and $N_{RX}$ receiving antennas to receive signals, may be referred to as an $N_{TX} \times N_{RX}$ diversity transmission system.

In a diversity transmission system, each of the plurality of $N_{TX}$ transmitting antennas may transmit data symbols from a corresponding plurality of $N_{TX}$ space time streams. The $N_{TX}$ space time streams may be generated from a plurality of $N_{SS}$ spatial streams. Each of the data symbols in each space time stream may be referred to as a codeword. In a diversity transmission system, which utilizes quasi-orthogonal STBC, at any given time instant, each of the plurality of $N_{TX}$ transmitting antennas may transmit a codeword, which comprises one of the OFDM symbols, or a permutated version of the OFDM symbol, from a selected one of the $N_{SS}$ spatial streams.

A variation of STBC is space frequency block coding (SFBC). In a diversity transmission system, which utilizes SFBC, each codeword may comprise a subset of the frequency carriers, or tones, and corresponding data portions, in an OFDM symbol. These subsets of frequency carriers may be referred to as tone groups.

In the case of diversity transmission, with either STBC or SFBC, the transmitted signal may be modified as it travels across a communication medium to the receiving station. This signal-modifying property of the communication medium may be referred to as fading. Each of the signals transmitted by each of the plurality of transmitting antennas may experience differing amounts of fading as the signals travel through the communication medium. This variable fading characteristic may be represented by a transfer function matrix, H, which comprises a plurality of transfer function coefficients, $h_{ij}$, that represent the differing fading characteristics experienced by the transmitted signals.

The transmitted signals with either STBC or SFBC may be received at a receiving antenna located at a receiving station. The receiving station may process the received signals to determine estimated values for the codewords carried by the transmitted signals. However, the task of computing estimated values for the codewords may be computationally complex even when quasi-orthogonal STBC or SFBC are utilized to suppress off-diagonal crosstalk.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for SFBC/STBC in a communication diversity system using angle feedback, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for SFBC/STBC in a communication diversity system using angle feedback. Various embodiments of the invention may comprise a method and system by which individual transmitted complex signals, in a multiple antenna transmit diversity system, may be rotated such that the group of signals may form an orthogonal set of transmitted complex signals. In an exemplary embodiment of the invention, a multiple antenna receive diversity system may comprise a corresponding plurality of decoder subsystems, which enable the multiple antenna receive diversity system to receive the orthogonal set of complex signals transmitted by the multiple antenna transmit diversity system. In another exemplary embodiment of the invention, the multiple antenna receive diversity system may comprise a single decoder subsystem, which enables the multiple antenna receive diversity system to receive the orthogonal set of complex signals transmitted by the multiple antenna transmit diversity system.

In an exemplary embodiment of the invention, each of the plurality of decoder subsystems in the receive diversity system may enable computation of feedback information based on the signals received via a corresponding one of the multiple antennas. The receive diversity system may transmit feedback information to the diversity transmitter system based on the plurality of computed feedback information values. The transmitted feedback information may comprise one of the computed feedback information values computed by a selected one of the plurality of decoder subsystems. In another exemplary embodiment of the invention, the single decoder subsystem in the receive diversity system may enable computation of feedback information based on the signals received via the multiple antennas. The receive diversity system may transmit the computed feedback information to the diversity transmitter system. In various embodiments of the invention, the transmit diversity system may transmit subsequent signals based on the received feedback information.

Figure 1:
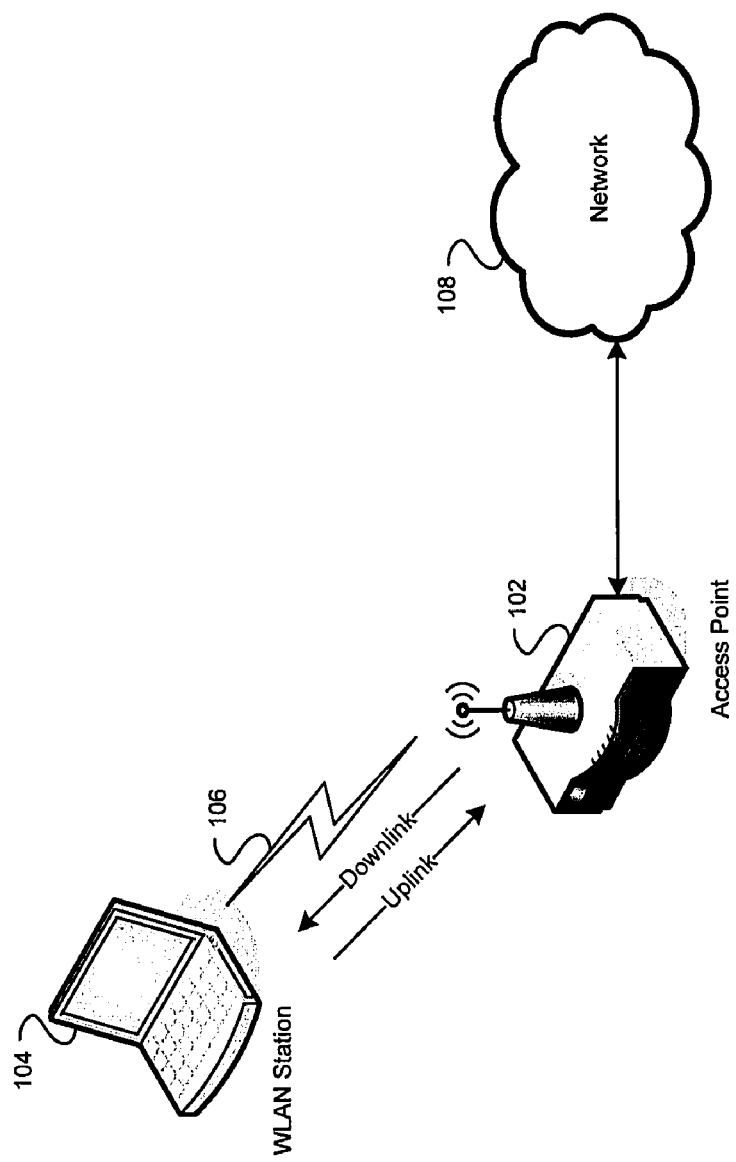
FIG. 1 is an exemplary wireless communication system, which may be utilized in connection with an embodiment of the invention.

FIG. 1 is an exemplary wireless communication system, which may be utilized in connection with an embodiment of the invention. Referring to FIG. 1, there is shown an access point (AP) 102, a wireless local area network (WLAN) station (STA) 104, and a network 108. The AP 102 and the STA 104 may communicate wirelessly via one or more radio frequency (RF) channels 106. The AP 102 and STA 104 may each comprise a plurality of transmitting antennas and/or receiving antennas. The AP may be communicatively coupled to the network 108. The AP 102, STA 104 and network 108 may enable communication based on one or more IEEE 802 standards, for example IEEE 802.11.

The STA 104 may utilize the RF channel 106 to communicate with the AP 102 by transmitting signals via an uplink channel. The transmitted uplink channel signals may comprise one of more frequencies associated with a channel as determined by a relevant standard, such as IEEE 802.11. The STA 104 may utilize the RF channel 106 to receive signals from the AP 102 via a downlink channel. Similarly, the received downlink channel signals may comprise one of more frequencies associated with a channel as determined by a relevant standard, such as IEEE 802.11.

The STA 104 and AP 102 may communicate via time division duplex (TDD) communications and/or via frequency division duplex communications. With TDD communications, the STA 104 may utilize the RF channel 106 to communicate with the AP 102 at a current time instant while the AP 102 may communicate with the STA 104 via the RF channel 106 at a different time instant. With TDD communications, the set of frequencies utilized in the downlink channel may be substantially similar to the set of frequencies utilized in the uplink channel. With FDD communications, the STA 104 may utilize the RF channel 106 to communicate with the AP 102 at the same time instant at which the AP 102 utilizes the RF channel 106 to communicate with the STA 104. With FDD communications, the set of frequencies utilized in the downlink channel may be different from the set of frequencies utilized in the uplink channel.

In an exemplary embodiment of the invention, the STA 104 may concurrently receive a plurality of signals transmitted by the AP 102, which utilizes a plurality of transmitting antennas, via the downlink portion of the RF channel 106. The STA 104 may utilize a plurality of receiving antennas to receive the concurrently transmitted signals from the AP 102. The STA 104 may compute channel feedback information based on the concurrently received plurality of signals. The computed feedback information may be represented as a feedback angle or as a complex-valued feedback factor. The STA 104 may transmit the computed feedback information to the AP 102 via the uplink portion of the RF channel 106. In an exemplary embodiment of the invention, the feedback information may be represented as a single-bit binary value. In other exemplary embodiments of the invention, the feedback information may be represented as a two-bit, or more, binary value. The AP 102 may utilize the received feedback information to rotate at least a portion of subsequent concurrently transmitted signals. The subsequent concurrently transmitted signals may comprise an orthogonal set of transmitted complex signals. The STA 104 may receive the orthogonal characteristics of the received subsequent concurrently transmitted signal may enable the STA 104 to process the received orthogonal set of transmitted complex signals such that a signal transmitted by any one of the transmitting antennas at the AP 102 may be detected at the STA 104 while substantially cancelling interference from signals concurrently transmitted by the other transmitting antennas at the AP 102.

In an exemplary embodiment of the invention, the STA 104 may comprise a plurality of decoder subsystems, which may be equal in number to the number of receiving antennas, wherein each receiving antenna is coupled to a corresponding one of the plurality of decoder subsystems. Each of the receiving antennas at the STA 104 may be utilized to receive the plurality of signals transmitted by the AP 102. Each of the plurality of decoder subsystems at the STA 104 may independently compute feedback information comprising a rotation angle and/or a complex-valued rotation factor. The rotation angle and/or rotation factor may be computed at the decoder subsystem based on the signal received by the corresponding receiving antenna. An $i^{th}$ one of the decoder subsystems may compute a rotation factor $c_i$ as represented in the following equation:

$$c_i = e^{2j\cdot\Theta_i} \text{ for } 0 \leq i \leq N_{RX} \quad [1]$$

where $\Theta_i$ represents the rotation angle computed by the $i^{th}$ decoder subsystem and $N_{RX}$ represents the number of receiving antennas at the STA 104. The STA 104 may select one of the computed rotation factors $c_i$. The feedback information transmitted by the STA 104 to the AP 102 may comprise selected rotation factor $c_i$.

In another exemplary embodiment of the invention, the STA 104 may comprise a single decoder subsystem, which may compute feedback information comprising a rotation angle, $\Theta$, and/or complex-valued rotation factor, c, as shown in equation [1]. The rotation angle and/or rotation factor may be computed at the single decoder subsystem based on the plurality of signals received via the plurality of $N_{RX}$ receiving angles. The feedback information transmitted by the STA 104 to the AP 102 may comprise the computed rotation factor, c.

Figure 2:
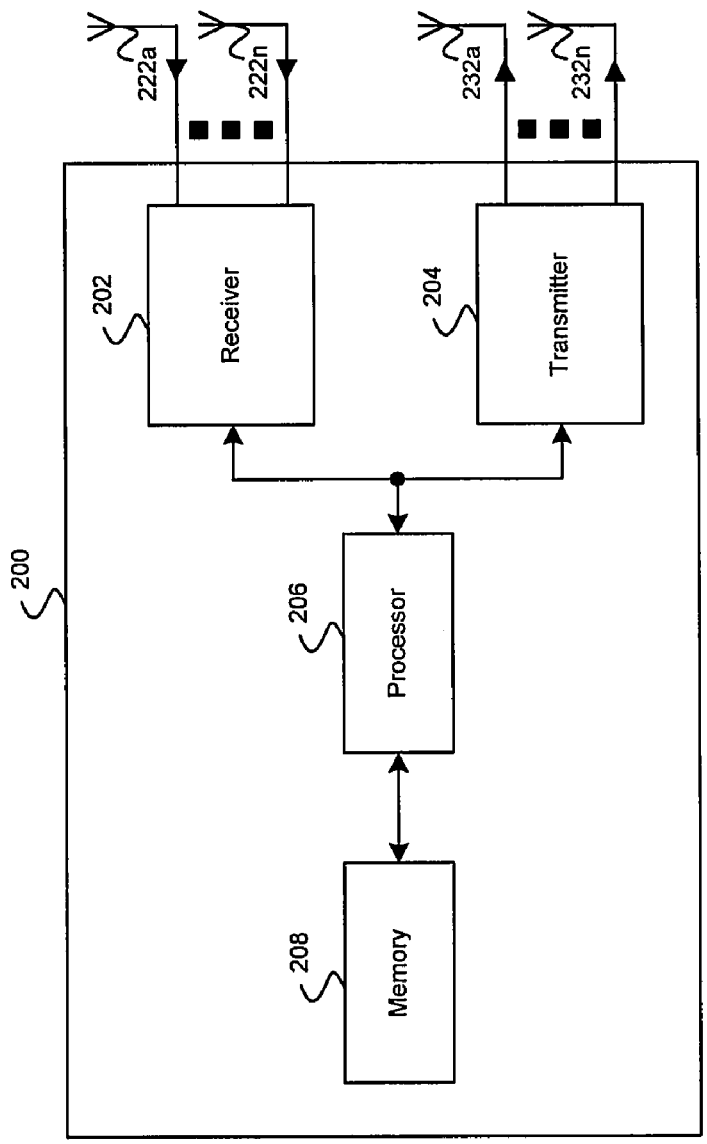
FIG. 2 is an exemplary transceiver comprising a plurality of transmitting antennas and a plurality of receiving antennas, which may be utilized in connection with an embodiment of the invention.

FIG. 2 is an exemplary transceiver comprising a plurality of transmitting antennas and a plurality of receiving antennas, which may be utilized in connection with an embodiment of the invention. Referring to FIG. 2, there is shown a transceiver system 200, a plurality of receiving antennas 222a...222n and a plurality of transmitting antennas 232a...232n. The transceiver system 200 may comprise at least a receiver 202, a transmitter 204, a processor 206, and a memory 208. Although a transceiver is shown in FIG. 2, transmit and receive functions may be separately implemented.

In accordance with an embodiment of the invention, the processor 206 may enable digital receiver and/or transmitter functions in accordance with applicable communications standards. The processor 206 may also perform various processing tasks on received data. The processing tasks may comprise computing channel estimates, which may characterize the wireless communication medium, delineating packet boundaries in received data, and computing packet error rate statistics indicative of the presence or absence of detected bit errors in received packets.

The receiver 202 may perform receiver functions that may comprise, but are not limited to, the amplification of received RF signals, generation of frequency carrier signals corresponding to selected RF channels, for example uplink channels, the down-conversion of the amplified RF signals by the generated frequency carrier signals, demodulation of data contained in data symbols based on application of a selected demodulation type, and detection of data contained in the demodulated signals. The RF signals may be received via one or more receiving antennas 222a...222n. The data may be communicated to the processor 206.

The transmitter 204 may perform transmitter functions that may comprise, but are not limited to, modulation of received data to generated data symbols based on application of a selected modulation type, generation of frequency carrier signals corresponding to selected RF channels, for example downlink channels, the up-conversion of the data symbols by the generated frequency carrier signals, and the generation and amplification of RF signals. The data may be received from the processor 206. The RF signals may be transmitted via one or more transmitting antennas 232a...232n.

The memory 208 may comprise suitable logic, circuitry and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM). In the context of the present application, the memory 208 may enable storage of code for the computation and storage of rotation angles based on channel feedback information, the computation and storage of channel estimates based on the channel feedback information and/or the storage of channel feedback information, for example.

In operation, the processor 206 may enable the computation of rotation angles and/or rotation factors based on signals received at the receiver 202 via the plurality of receiving antennas 222a...222n. The received signals may enable the computation of channel estimates, which characterize the wireless communication medium through which the received signals were transmitted. The computed channel estimates may, in turn, enable the computation of the rotation angles and/or rotation factors. The processor 206 may enable the computed rotation angles and/or rotation factors to be transmitted by the transmitter 204 via the plurality of transmitting antennas 232a...232n. The computed rotation angles and/or rotation factors may enable generation of orthogonal sets of transmitted signals, in accordance with various embodiments of the invention.

Figure 3A:
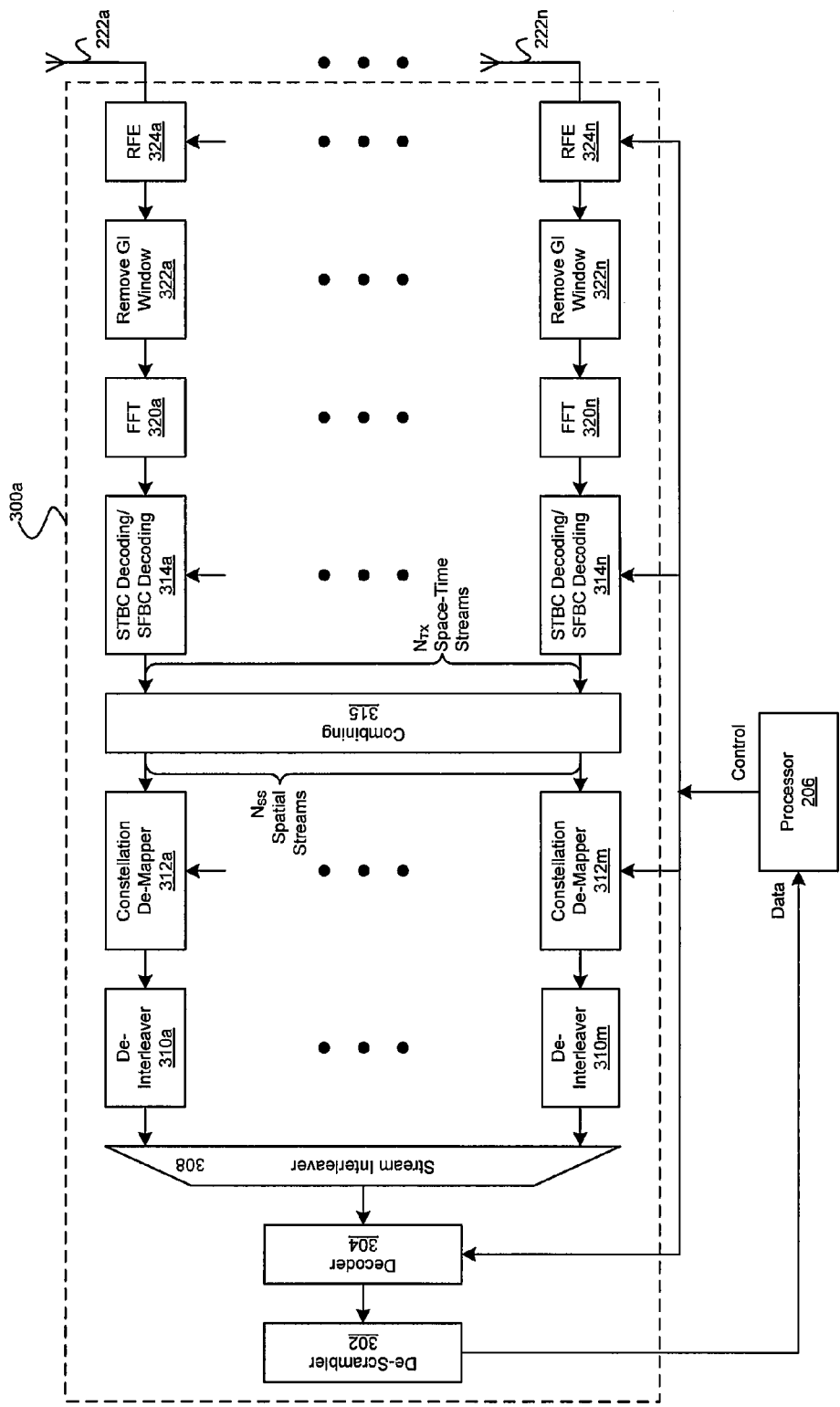
FIG. 3A is an exemplary block diagram of a multi-decoder receiver, in accordance with an embodiment of the invention.

FIG. 3A is an exemplary block diagram of a multi-decoder receiver, in accordance with an embodiment of the invention. Referring to FIG. 3A, there is shown a receiver 300a, a processor 206 and a plurality of receiving antennas 222a, ..., and 222n. The receiver 300a may comprise a plurality of radio front end (RFE) blocks 324a, ..., and 324n, a plurality of remove guard interval (GI) window blocks 322a, ..., and 322n, a plurality of fast Fourier transform (FFT) blocks 320a, ..., and 320n, a plurality of space time block (STBC) decoding and space frequency block (SFBC) decoding blocks 314a, ..., and 314n, a combining block 315, a plurality of constellation de-mapper blocks 312a, ..., and 312m, a plurality of de-interleaver blocks 310a, ..., and 310m, a stream interleaver 308, a decoder 304 and a de-scrambler 302. In FIG. 3A, the variable n represents the number of space-time streams ($n=N_{TX}$), and the variable m represents the number of spatial streams ($m=N_{ss}$). The receiver 300i a may be substantially similar to the receiver 202 described in FIG. 2.

The RFE block 324a may comprise suitable logic, circuitry, and/or code that may enable reception of an RF input signal, from the receiving antenna 222a, and generation of a digital baseband signal. The RFE block 324a may generate the digital baseband signal by utilizing a plurality of frequency carrier signals to downconvert the received RF signal. In an exemplary OFDM reception system, the plurality of frequency carrier signals, $f_i$, may be distributed across an RF channel bandwidth. Within a receiver 202, which may be compliant with IEEE 802.11 standards, the RFE block 324a may enable generation of frequency carrier signals across a 20 MHz bandwidth, or across a 40 MHz bandwidth, for example. The RFE block 324a may enable amplification of the downconverted RF signal and subsequent analoq-to-digital conversion (ADC) of downconverted RF signal to a digital baseband signal.

The digital baseband signal may comprise a sequence of binary signal levels, which are generated at a rate determined by the baseband frequency. The RFE block 324n may be substantially similar to the RFE block 324a. The receiving antenna 222n may be substantially similar to the receiving antenna 222a.

The remove GI window block 322a may comprise suitable logic, circuitry and/or code that may enable receipt of an input signal and generation of an output signal through removal of guard intervals in the received input signal. The input signal may comprise a sequence of received data words, each of which may comprise one or more binary signal levels. Each received data word may comprise a representation of a data signal received via the receiving antenna 222a at a given time instant. The guard interval may represent a time interval between individual received data words, which may establish a minimum time duration between the end of one received data word and the beginning of a succeeding received data word. The remove GI window block 322a may identify the locations of guard intervals in the received input signal and generate an output signal in which the guard intervals may be removed. The remove GI window block 322n may be substantially similar to the remove GI window block 322a.

The FFT block 320a may comprise suitable logic, circuitry and/or code that may enable calculations, based on an FFT algorithm. The FFT block 320a may receive an input baseband signal, which comprises a time-domain representation of the baseband signal. The FFT block 320 may perform processing, based on an FFT algorithm, to transform a time-domain representation of the input baseband signal to generate an output signal, which comprises a frequency-domain representation of the input signal. In an OFDM reception system, the frequency domain representation may enable the detection of individual data portions, which are distributed among the frequency carriers within an RF channel bandwidth. The FFT block 320n may be substantially similar to the FFT block 320a.

The STBC decoding/SFBC decoding block 314a may comprise suitable logic, circuitry, and/or code that may enable reception of received data words from a plurality of input space time streams and generation of one or more spatial streams. Each of the space time streams may comprise a plurality of data symbols. In an OFDM reception system, the data symbols may comprise OFDM symbols.

In an exemplary embodiment of the invention, the STBC decoding/SFBC decoding block 314a may process a sequence of received data words, Y, received from an input space time stream. The processing of sequence of received data words may comprise multiplying a vector representation of the sequence of received data words and a transfer function matrix, H, comprising a set of computed transfer function matrix coefficients. For each of the received data words in the sequence, y(n), the vector representation may comprise: a representation of the value of the received data word; or a representation of a permutated value of the received data word (wherein a permutated value may be determined as disclosed below). The variable n, in y(n), represents an index value in the sequence of received data words.

For a first portion of the computed transfer function matrix coefficients, the value for each of the computed transfer function matrix coefficients may comprise a computed channel estimate value, $h_m$, where the variable m represents an index value for any of the computed channel estimate values. For a second portion of the computed transfer function matrix coefficients, the value for each of the computed transfer function matrix coefficients may comprise a permutated version of a computed channel estimate value, $h_m^*$. An exemplary permutated version of a computed channel estimate value may be derived by generating a complex conjugate version of a computed channel estimate value. Another exemplary permutated version of the computed channel estimate value may be derived by multiplying the computed channel estimate value or the complex conjugate version by a scale factor of (−b), for example $-h_m$ or $-h_m^*$, where b may be a real number or a complex number (for example, b=1). For a third portion of the computed transfer function matrix coefficients, the value for each of the computed transfer function matrix coefficients may comprise a multiplicative product of: a computed channel estimate value, $h_m$, or a permutated version of the computed channel estimate value, $h_m^*$; and a computed rotation factor, $c_i$, or a permutated version of the computed rotation factor (where a permutated version of the computed rotation factor may be derived by a method substantially similar to that disclosed above), $c_i^*$.

In various embodiments of the invention, the computed transfer function matrix coefficients may consist of coefficients as described above in the first portion, coefficients as described above in the second portion, coefficients as described above in the third portion or any combination of coefficients as described above in the first, second or third portion.

In various embodiments of the invention, the computed rotation factor, $c_0$, utilized for processing the sequence of currently received data words may be computed based on one or more sequences of data words that were previously received at the STBC decoding block 314a. As a result of the processing of the sequence of currently received data words, wherein the processing is as described above, the STBC decoding block 314a may generate estimated values for a sequence of codewords, $\hat{X}$. The sequence of codewords may comprise individual codewords $\hat{x}(k)$, where the variable k represents an index value in the sequence of codewords.

For a receiver 300a, which utilizes an STBC decoding block 314a and OFDM, each received data word, y(n), may be received at a distinct time instant relative to other data words in the sequence. Furthermore, each of the codewords, $\hat{x}(k)$, in the generated sequence of codewords, $\hat{X}$, may represent a distinct OFDM symbol. In this case, the variable n, in y(n), represents a time instant $t_n$ and the variable k, in $\hat{x}(k)$, represents a time instant $t_k$. The STBC decoding block 314a may generate a spatial stream, which comprises the plurality of generated OFDM symbols.

For a receiver 300a, which utilizes an SFBC decoding block 314a and OFDM, each of the received data words, y(i), in the sequence of received data words, Y, may be received concurrently. In this case, the variable i, in y(i), represents a tone group, $f_j$. An individual tone group $f_j$ may comprise a portion of the plurality of carrier signal frequencies, which comprise an RF channel bandwidth. The group of received data words, y(j), may comprise a corresponding set of tone groups, which comprise the set of carrier signal frequencies that are contained within an RF channel bandwidth.

In the case in which an SFBC decoding block 314a and OFDM are utilized, each of the codewords, $\hat{x}(k)$, in the generated sequence of codewords, $\hat{X}$, may represent a portion of an OFDM symbol. The variable k, in $\hat{x}(k)$, represents a tone group $f_k$. Consequently, each codeword $\hat{x}(k)$ represents the portion of the OFDM symbol, which is associated with the corresponding tone group $f_k$. Thus, the group of codewords $\hat{x}(k)$ may be combined to generate an OFDM symbol.

The STBC decoding/SFBC decoding block 314n is substantially similar to the STBC decoding/SFBC decoding block 314a. The STBC decoding block/SFBC decoding block 314n may utilize a computed rotation factor, $c_1$, and may utilize a plurality of computed channel estimate values $g_m$. The value for the rotation factor $c_1$ is not necessarily equal to the value for the rotation factor $c_0$. Similarly, each channel estimate value $g_m$ is not necessarily equal to the value of the corresponding channel estimate $h_m$.

The combining block 315 may comprise suitable logic, circuitry and/or code that may enable reception of a plurality of $N_{TX}$ space-time streams and generation of $N_{SS}$ spatial streams. The constellation de-mapper block 312a may comprise suitable logic, circuitry, and/or code that may enable a signal level associated with a received individual data symbol to be mapped to a selected constellation point. Based on the selected constellation point, a plurality of binary signal levels may be generated. Each of the binary signal levels may represent a bit value. The number of bits generated based on the selected constellation point may be determined based on the modulation type utilized in connection with the de-mapping procedure. An exemplary modulation type is 64-level quadrature amplitude modulation (64-QAM). For example, for 64-QAM, the constellation de-mapper block 312a may generate a sequence of six bits based on a selected constellation point.

When the receiver 300a utilizes OFDM, the de-mapping procedure may be performed for each individual data symbol, which is associated with an individual carrier signal frequency within the RF channel bandwidth. Thus, the number of bits generated as a result of de-mapping of an OFDM symbol may comprise the aggregate number of bits generated by de-mapping the group of individual data symbols. The constellation mapper block 312m may be substantially similar to the constellation mapper block 312a.

The de-interleaver 310a may comprise suitable logic, circuitry, and/or code that may enable reordering of bits in a received spatial stream. The de-interleaver 310m may be substantially similar to the de-interleaver 310a.

The stream interleaver 308 may comprise suitable logic, circuitry, and/or code that may enable generation a data stream by merging bits received from a plurality of spatial streams.

The decoder block 304 may comprise suitable logic, circuitry and/or code that may enable the generation of decoded data bits from encoded data bits received via an input data stream. The decoding process may enable the detection and/or correction of bit errors in the stream of received encoded data bits. Viterbi decoding is an exemplary decoding method, which may be utilized at the decoder block 304.

The de-scrambler 302 may comprise suitable logic, circuitry, and/or code that may enable generation of a descrambled block of bits from a received scrambled block of bits. The descrambled block of bits may comprise received data, which may be processed.

In an exemplary embodiment of the invention, the receiver 300a may be located within the STA 104 (FIG. 1), which utilizes two receiving antennas 222a and 222n. In operation, the processor 206 may configure the receiver 300a to receive signals transmitted by the AP 102 via the receiving antennas 222a and 222n. For example, the processor 206 may configure the RFE blocks 324a and 324n to select an RF frequency band for received signals. The processor 206 may configure the STBC decoding/SFBC decoding blocks 314a and 314n for either space time or space frequency block decoding. The processor 206 may configure the constellation de-mapper blocks 312a and 312m to utilize a selected modulation type. The processor 206 may configure parameters utilized by the decoder block 304, for example, a coding rate for binary convolutional decoding.

The first signals received by the receiver 300a may comprise preamble data. RF signals may be received by the RFE 324a and 324n, which downconverts the RF signals received via a selected RF channel to baseband signals. The remove GI window blocks 322a and 322n remove guard intervals between detected preamble data words, $y_{pre}$, in the received baseband signals. The FFT blocks 320a and 320n may receive a time-domain representation of the received baseband signals and generate a frequency domain representation of the received baseband signals. The STBC decoding/SFBC decoding blocks 314a and 314n perform the applicable decoding task, which enables reception of the detected preamble data words, y, and the generation of preamble codewords, $x_{pre}$. The constellation de-mapper blocks 312a and 312m may utilize frequency domain representations of the preamble codewords to generate sequences of bits. The constellation de-mapper blocks 312a and 312m may utilize a predetermined modulation type, for example binary phase-shift keying (BPSK), when performing the constellation de-mapper task. The deinterleaver blocks 310a and 310m may rearrange the order of bits in each respective spatial stream. The stream interleaver 308 may combine the bits from each spatial stream to generate a single data stream. The data stream may comprise encoded data. The decoder block 304 may perform decoding on the preamble data to generate decoded data. The decoder block 304 may utilize the encoded data to detect and/or correct bit errors which may otherwise occur in the decoded data. The descrambler 302 may utilize a descrambling algorithm to descramble the decoded data and generate preamble data.

The processor 206 may utilize the preamble data to compute the transfer function matrix, H, comprising a plurality of computed channel estimate coefficient values. The channel estimate coefficient values may characterize the RF channel 106 utilized for communication between the AP 102 and the STA 104 in the downlink direction. The processor 206 may compute a first set of channel estimate coefficient values, $h_m$, which characterize the RF channel 106 for signals received by the receiving antenna 222a, and a second set of channel estimate coefficient values, $g_m$, which characterize the RF channel 106 for signals received by the receiving antenna 222n. In each case, m represents an index value for an individual coefficient, $h_m$ or $g_m$, within the matrix, H. Based on the set of computed channel estimate coefficient values, $h_m$, the processor 206 may compute a first rotation factor, $c_0$. The processor 206 may compute a second rotation factor, $c_1$, based on the set of computed channel estimate coefficient values, $g_m$. The processor 206 may select either the first rotation factor, $c_0$, or the second rotation factor, $c_1$. The processor 206 may send the selected rotation factor, $c_i$, to the transmitter 204, where it may be transmitted to the AP 102 as feedback information via the RF channel 106 in the uplink direction. The processor 206 may also configure the STBC decoding/SFBC decoding blocks 314a and 314n to utilize the selected rotation factor, $c_i$, when processing subsequent received signals.

Figure 3B:
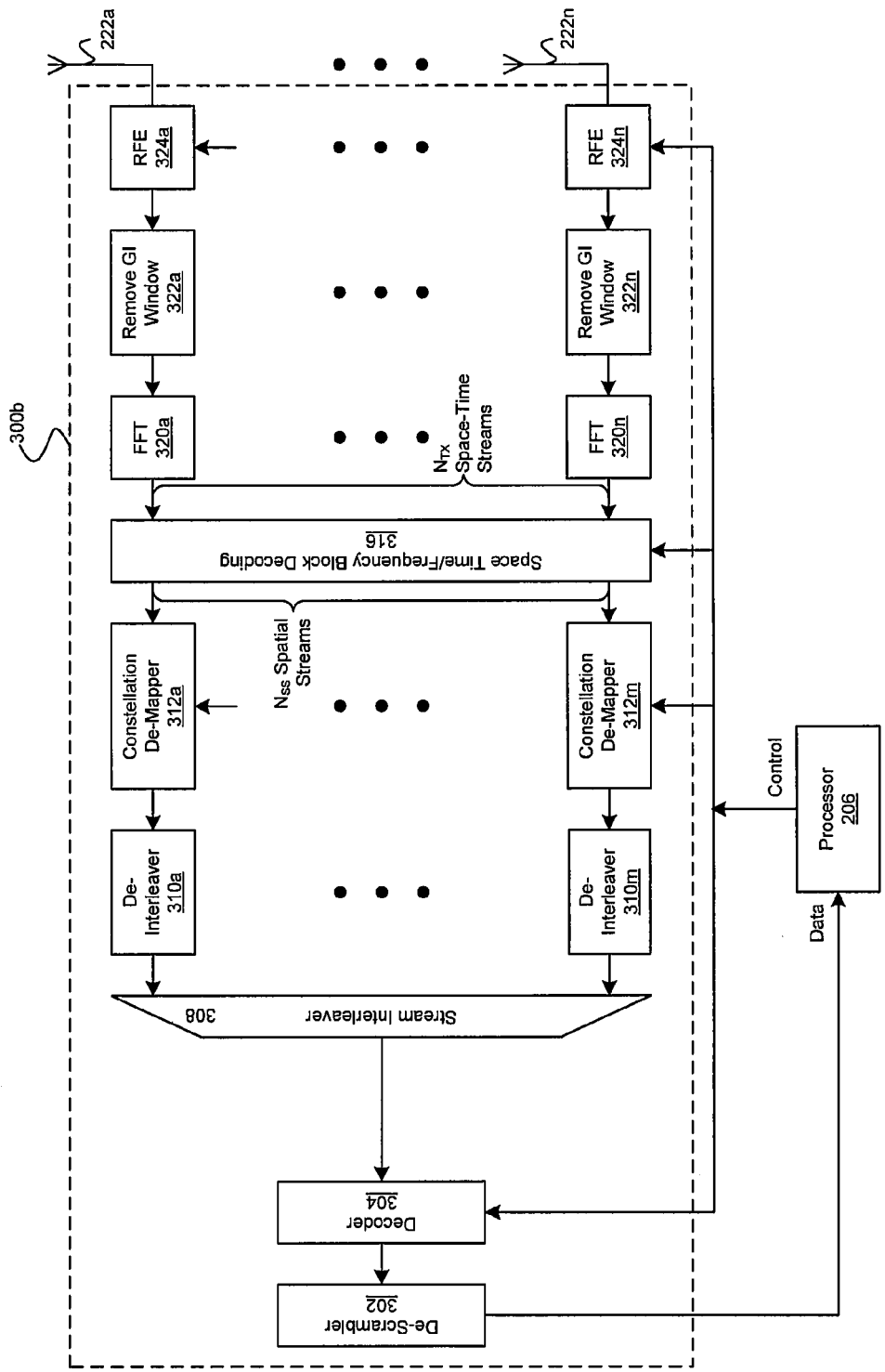
FIG. 3B is an exemplary block diagram of a single decoder receiver, in accordance with an embodiment of the invention.

FIG. 3B is an exemplary block diagram of a single decoder receiver, in accordance with an embodiment of the invention. Referring to FIG. 3B, there is shown a receiver 300b, which utilizes a single STBC decoding/SFBC decoding block 316, in comparison to the receiver 300a, shown in FIG. 3A, which utilizes a plurality of STBC decoding/SFBC decoding blocks 314a . . . 314n.

In operation, the processor 206 may utilize preamble data to compute the channel estimate sets of channel estimate coefficient values, $h_m$ and $g_m$. Based on the sets of computed channel estimate coefficient values, $h_m$ and $g_m$, the processor 206 may compute a single rotation factor, c. The processor 206 may send the computed rotation factor, c, to the transmitter 204, where it may be transmitted to the AP 102 as feedback information via the RF channel 106 in the uplink direction. The processor 206 may also configure the STBC decoding/SFBC decoding block 316 to utilize the computed rotation factor, c, when processing subsequent received signals.

Figure 4:
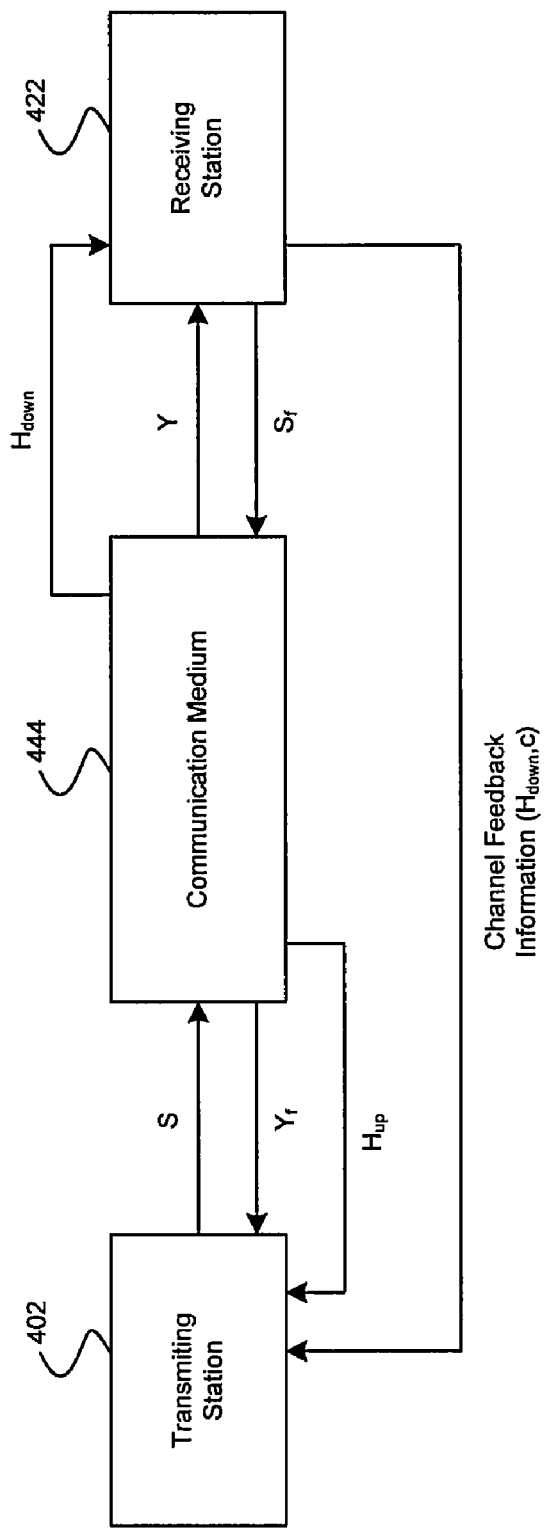
FIG. 4 is an exemplary diagram illustrating channel feedback, which may be utilized in connection with an embodiment of the invention.

FIG. 4 is an exemplary diagram illustrating channel feedback, which may be utilized in connection with an embodiment of the invention. Referring to FIG. 4, there is shown a transmitting station 402, a receiving station 422, and a communications medium 444. The communications medium 444 may represent a wireless communications medium. The transmitting station 402 may represent an AP 102 and the receiving station may represent an STA 104, for example. The transmitting station 402 may transmit a signal vector S to the receiving station 422 via the communications medium 444. The communications direction from the transmitting station 402 to the receiving station 422 may be referred to as a downlink direction. The signal vector S may comprise a plurality of signals, which are concurrently transmitted via one or more transmitting antennas that are located at the transmitting station 402. The transmitted signals, which are represented in the signal vector S, may travel through the communications medium 444. The transmitted signals may be altered while traveling through the communications medium 444. The transmission characteristics associated with the communications medium 444 may be characterized by the transfer function matrix, H. The transmitted signals, which are represented by the signal vector S, may be altered based on the transfer function matrix H. In the downlink direction, the transfer function matrix H may be referred to as $H_{down}$. The signals received at the receiving station 422 may be represented by the signal vector, Y. The signal vector Y may be generated based on the signal vector S and the transfer function matrix H as shown in the following equation:

$$Y = H_{down} \times S \quad [2]$$

The coefficients, which are the matrix elements within the transfer function matrix H, may comprise channel estimate values, $h_m$. The channel estimate values may be computed based on at least a portion of the received signals represented by the signal vector Y. In an exemplary embodiment of the invention, the channel estimate values may be computed based on the portion(s) of the signals, transmitted by the transmitting station 402, which carry preamble data.

The receiving station 422 may compute a rotation angle θ based on channel estimate values from the transfer function matrix $H_{down}$. Based on the rotation angle, the receiving station 422 may compute at least one rotation factor, c. In various embodiments of the invention, the rotation factor may be computed as shown in equation [1]. The receiving station 422 may communicate the computed transfer function matrix $H_{down}$ and/or rotation factor c to the transmitting station 402 as channel feedback information, as represented by the tuple ($H_{down}$,c), for example. The receiving station 422 may communicate the channel feedback information ($H_{down}$,c) via one or more signals, which are represented by the transmitted signal vector $S_f$. The signals represented by the transmitted signal vector $S_f$ may be transmitted to the transmitting station 402 via the communications medium 444. The signals represented by the signal vector $S_f$ may be altered while traveling through the communications medium 444. The communications direction from the receiving station 422 to the transmitting station 402 may be referred to as an uplink direction. In the uplink direction the transfer function matrix may be referred to as $H_{up}$. The signals received at the transmitting station 402 may be represented by the signal vector, $Y_f$. The signal vector $Y_f$ may be generated based on the signal vector $S_f$ and the transfer function matrix $H_{up}$ as shown in the following equation:

$$Y_f = H_{down} \times S_f \quad [3]$$

The transmitting station 402 may utilize the rotation factor, c, received in the channel feedback information to generate subsequent transmitted signals.

In another exemplary embodiment of the invention, the receiving station 422 may communicate the channel feedback information, which comprises the computed transfer function matrix, H, and/or the computed rotation angle θ. The transmitting station 402 may utilize the computed rotation angle θ received via the channel feedback information to compute a rotation factor, c.

Figure 5:
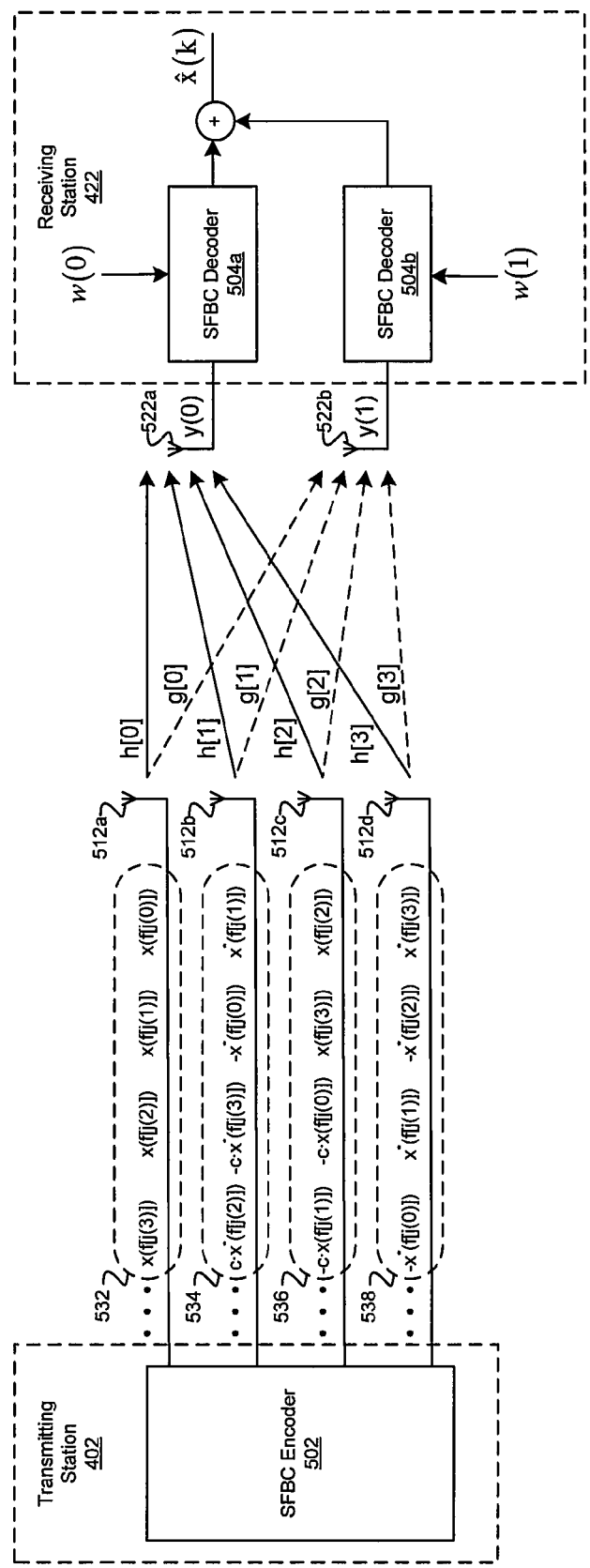
FIG. 5 is an exemplary block diagram of SFBC with diversity reception in a multiple decoder receiver, in accordance with an embodiment of the invention.

FIG. 5 is an exemplary block diagram of SFBC with diversity reception in a multiple decoder receiver, in accordance with an embodiment of the invention. Referring to FIG. 5, there is shown a transmitting station 402 and a receiving station 422. The transmitting station 402 may comprise an SFBC encoder 502. The transmitting station 402 may utilize diversity transmission by concurrently transmitting a plurality of RF output signals via at least a portion of the transmitting antennas 512a, 512b, 512c and 512d. The concurrently transmitted plurality of RF output signals may form a signal group. Each RF output signal may comprise a plurality of concurrently transmitted codewords. Each of the codewords within a transmitted RF output signal may be associated with a tone group. The concurrently transmitted codewords within a transmitted RF output signal may be combined to form an OFDM symbol. For the exemplary transmitting station 402 shown in FIG. 5, the number of space time streams, $N_{sts}$, is equal to the number of transmitting antennas, $N_{TX}$: $N_{sts} = N_{TX} = 4$. The receiving station 422 may comprise a plurality of SFBC decoders 504a and 504b. The receiving station 422 may receive signals via the receiving antennas 522a and 522b. For the exemplary receiving station 422 shown in FIG. 5, the number of receiving antennas, $N_{RX}$, is equal to 2.

The transmitting station 402 may utilize SFBC to transmit OFDM symbols 532, 534, 536 and 538. When transmitting OFDM symbol 532, the transmitting station 402 may transmit codewords x(f[j(0)]), x(f[j(1)]), x(f[j(2)]) and x(f[j(3)]) via transmitting antenna 512a, where j(0) refers to indexes for carrier frequencies associated with a first tone group, j(1) refers to carrier frequencies associated with a second tone group, and so on. The frequencies f[j(0)], f[j(1)], f[j(2)] and f[j(3)] refer to carrier frequencies indexed by indexes j(0), j(1), j(2) and j(3) respectively. In an exemplary embodiment of the invention, the set of index values j(0), j(1), j(2) and j(3) within each tone group are as shown below:

$$j(0) = 0, 4, 8, \ldots, \left(\left\lceil \frac{N_{fc}}{4} \right\rceil - 1\right) \cdot 4;$$

$$j(1) = 1, 5, 9, \ldots, \left(\left\lceil \frac{N_{fc}}{4} \right\rceil - 1\right) \cdot 4 + 1;$$

$$j(2) = 2, 6, 10, \ldots, \left(\left\lceil \frac{N_{fc}}{4} \right\rceil - 1\right) \cdot 4 + 2; \text{ and}$$

$$j(3) = 3, 7, 11, \ldots, \left(\left\lceil \frac{N_{fc}}{4} \right\rceil - 1\right) \cdot 4 + 3 \quad [4]$$

where $N_{fc}$ refers to the number of frequency carriers within an RF channel bandwidth.

When transmitting OFDM symbol 534, the transmitting station 402 may transmit codewords x*(f[j(1)]), −x*(f[j(0)]), −c·x*(f[j(3)]) and c·x*(f[j(2)]) via transmitting antenna 512b, where x* refers to a complex conjugate of x, and c refers to a rotation factor, such as is computed in equation [1] for example. When transmitting OFDM symbol 536, the transmitting station 402 may transmit codewords x(f[j(2)]), x(f[j(3)]), −c·x*(f[j(0)]) and —c·x(f[j(1)]) via transmitting antenna 512c. When transmitting OFDM symbol 538, the transmitting station 402 may transmit codewords x*(f[j(3)]), −x*(f[j(2)]), x*(f[j(1)]) and −x*(f[j(0)]) via transmitting antenna 512d.

Signals transmitted from the transmitting antennas 512a, 512b, 512c and 512d travel through a wireless communication medium and may be received at the receiving antennas 522a and 522b. The signals received at the receiving antenna 522a are described followed by the description of the signals received at the receiving antenna 522b. Signals traveling from the transmitting antenna 512a and received at the receiving antenna 522a may be modified based on the channel estimate value h[0]; signals traveling from the transmitting antenna 512b and received at the receiving antenna 522a may be modified based on the channel estimate value h[1]; signals traveling from the transmitting antenna 512c and received at the receiving antenna 522a may be modified based on the channel estimate value h[2]; and signals traveling from the transmitting antenna 512d and received at the receiving antenna 522a may be modified based on the channel estimate value h[3].

The signals received at the SFBC decoder 504a, y(0), may be represented as in the following equation:

$$\begin{bmatrix} y_0(f[j(0)]) \\ y_0^*(f[j(1)]) \\ y_0(f[j(2)]) \\ y_0^*(f[j(3)]) \end{bmatrix} = \begin{bmatrix} h[0] & h[1] & h[2] & h[3] \\ -h^*[1] & h^*[0] & -h^*[3] & h^*[2] \\ -c_0 \cdot h[2] & h[3] & h[0] & -c_0 \cdot h[1] \\ -h^*[3] & -c_0^* \cdot h^*[2] & c_0^* \cdot h^*[1] & h^*[0] \end{bmatrix} \begin{bmatrix} x(f[j(0)]) \\ x^*(f[j(1)]) \\ x(f[j(2)]) \\ x^*(f[j(3)]) \end{bmatrix} + \begin{bmatrix} n_0 \\ n_1 \\ n_2 \\ n_3 \end{bmatrix} \quad [5]$$

where y(0) is represented as $y_0$. Equation [5] may be represented as follows:

$$\begin{bmatrix} y_0(f[j(0)]) \\ y_0^*(f[j(1)]) \\ y_0(f[j(2)]) \\ y_0^*(f[j(3)]) \end{bmatrix} = H \times \begin{bmatrix} x(f[j(0)]) \\ x^*(f[j(1)]) \\ x(f[j(2)]) \\ x^*(f[j(3)]) \end{bmatrix} + \begin{bmatrix} n_0 \\ n_1 \\ n_2 \\ n_3 \end{bmatrix} \quad [6]$$

where $n_0$, $n_1$, $n_2$ and $n_3$ represent signal noise.

In various embodiments of the invention, a square matrix may be derived by pre-multiplying the left and right hand sides of equation [6] by $H^H$, where $H^H$ represents a Hermitian (or complex conjugate transpose version) of H. The square matrix, $H_{sq}$, may be represented as shown in the following equation:

$$H_{sq} = H^H \times H \quad [7]$$

$$= \begin{bmatrix} \sum_i |h[i]|^2 & 0 & \delta_0 & 0 \\ 0 & \sum_i |h[i]|^2 & 0 & \delta_0^* \\ \delta_0^* & 0 & \sum_i |h[i]|^2 & 0 \\ 0 & \delta_0 & 0 & \sum_i |h[i]|^2 \end{bmatrix}$$

where:

$$\delta_0 = h^*[0] \cdot h[2] + h[1] \cdot h^*[3] - c_0^* \cdot (h^*[0] \cdot h[2] + h[1] \cdot h^*[3])^* \quad [8]$$

In an exemplary embodiment of the invention, the rotation factor value, $c_0$, may be selected such that the value of the crosstalk term, $\delta_0$, in equations [7] and [8] is approximately 0. In this aspect of the invention, the square matrix, $H_{sq}$, may also be referred to as an orthogonal matrix. The rotation factor value, $c_0$, may be computed as a function of the channel estimate values, where the channel estimate values may be determined based on the signals received by the decoder 504a as described above. The rotation factor value, $c_0$, may be computed as shown in the following equations:

$$\theta_0 = \text{angle}(h[0] \cdot h^*[2] + h^*[1] \cdot h[3]) \quad [9]$$

and:

$$c_0 = e^{2j \cdot \theta_0} \quad [10]$$

where angle(x) represents the trigonometrically computed angle of x, and $j = \sqrt{-1}$.

Signals traveling from the transmitting antenna 512a and received at the receiving antenna 522b may be modified based on the channel estimate value g[0]; signals traveling from the transmitting antenna 512b and received at the receiving antenna 522b may be modified based on the channel estimate value g[1]; signals traveling from the transmitting antenna 512c and received at the receiving antenna 522b may be modified based on the channel estimate value g[2]; and signals traveling from the transmitting antenna 512d and received at the receiving antenna 522b may be modified based on the channel estimate value g[3].

The signals received at the SFBC decoder 504b, y(1), may be represented as in the following equation:

$$\begin{bmatrix} y_1(f[j(0)]) \\ y_1^*(f[j(1)]) \\ y_1(f[j(2)]) \\ y_1^*(f[j(3)]) \end{bmatrix} = \begin{bmatrix} g[0] & g[1] & g[2] & g[3] \\ -g^*[1] & g^*[0] & -g^*[3] & g^*[2] \\ -c_1 \cdot g[2] & g[3] & g[0] & -c_1 \cdot g[1] \\ -g^*[3] & -c_1^* \cdot g^*[2] & c_1^* \cdot g^*[1] & g^*[0] \end{bmatrix} \begin{bmatrix} x(f[j(0)]) \\ x^*(f[j(1)]) \\ x(f[j(2)]) \\ x^*(f[j(3)]) \end{bmatrix} + \begin{bmatrix} n_0 \\ n_1 \\ n_2 \\ n_3 \end{bmatrix} \quad [12]$$

where y(1) is represented as $y_1$. Equation [12] may be represented as follows:

$$\begin{bmatrix} y_1(f[j(0)]) \\ y_1^*(f[j(1)]) \\ y_1(f[j(2)]) \\ y_1^*(f[j(3)]) \end{bmatrix} = G \times \begin{bmatrix} x(f[j(0)]) \\ x^*(f[j(1)]) \\ x(f[j(2)]) \\ x^*(f[j(3)]) \end{bmatrix} + \begin{bmatrix} n_0 \\ n_1 \\ n_2 \\ n_3 \end{bmatrix} \quad [13]$$

In various embodiments of the invention, a square matrix may be derived by pre-multiplying the left and right hand sides of equation [13] by $G^H$. The square matrix, $G_{sq}$, may be represented as shown in the following equation:

$$G_{sq} = G^H \times G \qquad [14]$$

$$= \begin{bmatrix} \sum_i |g[i]|^2 & 0 & \delta_1 & 0 \\ 0 & \sum_i |g[i]|^2 & 0 & \delta_1^* \\ \delta_1^* & 0 & \sum_i |g[i]|^2 & 0 \\ 0 & \delta_1 & 0 & \sum_i |g[i]|^2 \end{bmatrix}$$

where:

$$\delta_1 = g^*[0] \cdot g[2] + g[1] \cdot g^*[3] - c^*_1 \cdot (g^*[0] \cdot g[2] + g[1] \cdot g^*[3])^* \qquad [15]$$

Based on the pre-multiplying of both sides of equation [6] by the matrix $H^H$ and both sides of equation [13] by $G^H$, the SFBC decoders 504a and 504b may enable computation of estimated values for the codewords as represented by $\hat{x}(f[j(0)])$, $\hat{x}(f[j(1)])$, $\hat{x}(f[j(2)])$ and $\hat{x}(f[j(3)])$. In various embodiments of the invention, the estimated values may be computed utilizing methods such as maximum likelihood sequence estimation (MLSE), minimum mean squared error (MMSE) and/or successive interference cancellation (SIC).

In an exemplary embodiment of the invention, the rotation factor value, $c_1$, may be selected such that the value of the crosstalk term, $\delta_1$, in equations [14] and [15] is approximately 0. The rotation factor value, $c_1$, may be computed as a function of the channel estimate values, where the channel estimate values may be determined based on the signals received by the decoder 504b as described above. The rotation factor value, $c_1$, may be computed as shown in the following equations:

$$\theta_1 = \text{angle}(g[0] \cdot g^*[2] + g^*[1] \cdot g[3]) \qquad [16]$$

and:

$$c_1 = e^{2j\theta_1} \qquad [17]$$

where $j = \sqrt{-1}$.

In various embodiments of the invention, the receiving station 422 may select one of the plurality of computed rotation factors, for example $c_0$ or $c_1$, which produces the smallest value for the crosstalk term. In an exemplary embodiment of the invention, the receiving station 422 may compute the value of the crosstalk term, $\delta_1(c_0)$, when $c = c_0$ and the value of the crosstalk term, $\delta_0(c_1)$, when $c = c_1$ as shown below:

$$\delta_1(c_0) = g^*_0 \cdot g_2 + g_1 \cdot g^*_3 - c^*_0 \cdot (g^*_0 \cdot g_2 + g_1 \cdot g^*_3)^* \qquad [18]$$

$$\delta_0(c_1) = g^*_0 \cdot g_2 + g_1 \cdot g^*_3 - c^*_1 \cdot (g^*_0 \cdot g_2 + g_1 \cdot g^*_3)^* \qquad [19]$$

$c_0$ is the selected rotation factor when $\delta_1(c_0) < \delta_0(c_1)$, otherwise $c_1$ is the selected rotation factor.

In another exemplary embodiment of the invention, the receiving station 422 may select one of the plurality of computed rotation factors, which produces the smaller condition number. In this exemplary embodiment, the matrix $G_{sq}(c_0) = G^H \times G(c_0)$ is computed wherein the value $c = c_0$ is utilized in the computation. Similarly, the matrix $H_{sq}(c_1) = H^H \times H(c_1)$ is computed wherein the value $c = c_1$ is utilized in the computation. Condition numbers $\text{cond}(G^H \times G(c_0))$ and $\text{cond}(H^H \times H(c_1))$ are computed. $c_0$ is the selected rotation factor when $\text{cond}(G^H \times G(c_0)) < \text{cond}(H^H \times H(c_1))$, otherwise $c_1$ is the selected rotation factor.

Various embodiments of the invention may also be practiced in a transmitting station 402, which utilizes a plurality of STBC encoders. Various embodiments of the invention may also be practiced in an STBC diversity communication system in a transmitting station 402, which utilizes one or more STBC encoders and/or in a receiving station 422, which utilizes a plurality of STBC decoders. The number of STBC decoders may equal the number of receiving antennas, $N_{RX}$.

Figure 6:
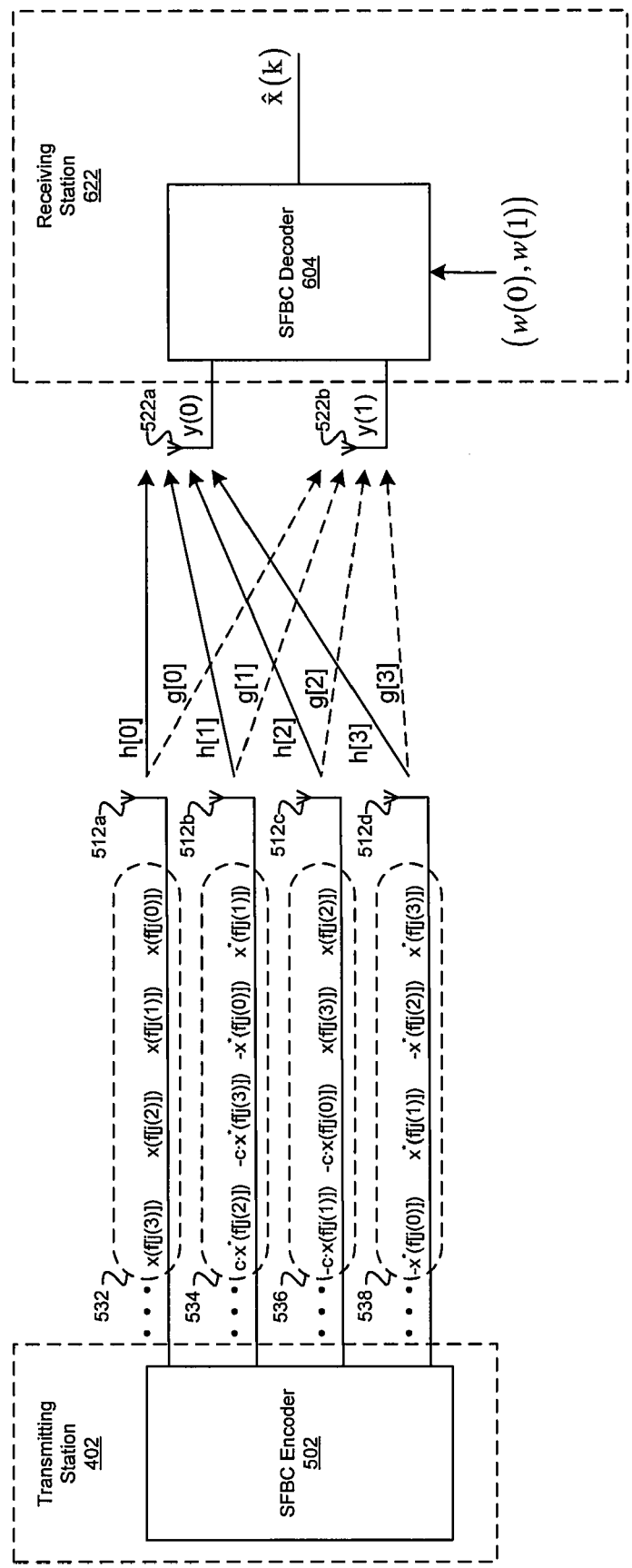
FIG. 6 is an exemplary block diagram of SFBC with diversity reception in a single decoder receiver, in accordance with an embodiment of the invention.

FIG. 6 is an exemplary block diagram of SFBC with diversity reception in a single decoder receiver, in accordance with an embodiment of the invention. Referring to FIG. 6, the receiving station 622 utilizes a single SFBC decoder 604 in comparison to the plurality of SFBC decoders 504a and 504b utilized in the receiving station 422 shown in FIG. 5. The single SFBC decoder 604 receives signals y(0) via receiving antenna 522a and signals y(1) via receiving antenna 522b.

The signals received at the SFBC decoder 604, y(0) and y(1), may be represented as in the following equation:

$$\begin{bmatrix} y_0(f[j(0)]) \\ y_0^*(f[j(1)]) \\ y_0(f[j(2)]) \\ y_0^*(f[j(3)]) \\ y_1(f[j(0)]) \\ y_1^*(f[j(1)]) \\ y_1(f[j(2)]) \\ y_1^*(f[j(3)]) \end{bmatrix} = \begin{bmatrix} h[0] & h[1] & h[2] & h[3] \\ -h^*[1] & h^*[0] & -h^*[3] & h^*[2] \\ -c \cdot h[2] & h[3] & h[0] & -c \cdot h[1] \\ -h^*[3] & -c^* \cdot h^*[2] & c^* \cdot h^*[1] & h^*[0] \\ g[0] & g[1] & g[2] & g[3] \\ -g^*[1] & g^*[0] & -g^*[3] & g^*[2] \\ -c \cdot g[2] & g[3] & g[0] & -c \cdot g[1] \\ -g^*[3] & -c^* \cdot g^*[2] & c^* \cdot g^*[1] & g^*[0] \end{bmatrix} \begin{bmatrix} x(f[j(0)]) \\ x^*(f[j(1)]) \\ x(f[j(2)]) \\ x^*(f[j(3)]) \end{bmatrix} + \begin{bmatrix} n_{00} \\ n_{01} \\ n_{02} \\ n_{03} \\ n_{10} \\ n_{11} \\ n_{12} \\ n_{13} \end{bmatrix} \qquad [20]$$

where y(0) is represented as $y_0$ and y(1) is represented as $y_1$. Equation [20] may be represented as follows:

$$\begin{bmatrix} y_0(f[j(0)]) \\ y_0^*(f[j(1)]) \\ y_0(f[j(2)]) \\ y_0^*(f[j(3)]) \\ y_1(f[j(0)]) \\ y_1^*(f[j(1)]) \\ y_1(f[j(2)]) \\ y_1^*(f[j(3)]) \end{bmatrix} = \overline{H} \times \begin{bmatrix} x(f[j(0)]) \\ x^*(f[j(1)]) \\ x(f[j(2)]) \\ x^*(f[j(3)]) \end{bmatrix} + \begin{bmatrix} n_{00} \\ n_{01} \\ n_{02} \\ n_{03} \\ n_{10} \\ n_{11} \\ n_{12} \\ n_{13} \end{bmatrix} \qquad [21]$$

In various embodiments of the invention, a square matrix may be derived by pre-multiplying the left and right hand sides of equation [21] by $\overline{H}^H$. The square matrix, $\overline{H}_{sq}$, may be represented as shown in the following equation:

$$\overline{H}_{sq} = \overline{H}^H \times \overline{H} \qquad [14]$$

$$= \begin{bmatrix} \sum_i (|h[i]|^2 + |g[i]|^2) & 0 & \delta & 0 \\ 0 & \sum_i (|h[i]|^2 + |g[i]|^2) & 0 & \delta^* \\ \delta^* & 0 & \sum_i (|h[i]|^2 + |g[i]|^2) & 0 \\ 0 & \delta & 0 & \sum_i (|h[i]|^2 + |g[i]|^2) \end{bmatrix}$$

where:

$$\delta = h^*[0] \cdot h[2] + h[1] \cdot h^*[3] + g^*[0] \cdot g[2] + g[1] \cdot g^*[3] - c^* \cdot (h^*[0] \cdot h[2] + h[1] \cdot h^*[3] + g^*[0] \cdot g[2] + g[1] \cdot g^*[3])^* \qquad [23]$$

Based on the pre-multiplying of both sides of equation [21] by the matrix $\overline{H}^H$, the SFBC decoder 604 may enable computation of estimated values for the codewords as represented by $\hat{x}(f[j(0)])$, $\hat{x}(f[j(1)])$, $\hat{x}(f[j(2)])$ and $\hat{x}(f[j(3)])$. In various embodiments of the invention, the estimated values may be computed utilizing methods such as MLSE, MMSE and/or SIC.

In an exemplary embodiment of the invention, the rotation factor value, c, may be selected such that the value of the crosstalk term, $\delta$, in equations [22] and [23] is approximately 0. The rotation factor value, c, may be computed as a function of the channel estimate values, where the channel estimate values may be determined based on the signals received by the decoder 604 as described above. The rotation factor value, c, may be computed as shown in the following equations:

$$\theta = \text{angle}(h[0] \cdot h^*[2] + h^*[1] \cdot h[3] + g[0] \cdot g^*[2] + g^*[1] \cdot g[3]) \qquad [24]$$

and:

$$c = e^{2 \cdot j \cdot \theta} \qquad [25]$$

where $j = \sqrt{-1}$.

In various embodiments of the invention, the SFBC decoder 604 may compute a rotation factor, c, which may enable the value of the crosstalk term $\delta$ to be approximately equal to zero, for signals y(0) and y(1), which are jointly received at the single decoder 604.

Various embodiments of the invention, as shown in FIG. 5 and/or FIG. 6 may be practiced in a transmitting station 402, which utilizes a plurality of $N_{TX}$ transmitting antennas and/or in a receiving station 422 or 622, which utilizes a plurality of $N_{RX}$ transmitting antennas, where $N_{TX}$ represents the number of transmitting antennas and $N_{RX}$ represents the number of receiving antennas.

In various exemplary embodiments of the invention as represented in FIG. 5 and/or FIG. 6, the rotation value, c, may be represented as a single bit value. For example, with reference to the exemplary embodiments shown in FIG. 6:

if $$\begin{pmatrix} \text{Re}(h[0] \cdot h^*[2] + h^*[1] \cdot h[3] + g[0] \cdot g^*[2] + g^*[1] \cdot g[3]) > \\ \text{Im}(h[0] \cdot h^*[2] + h^*[1] \cdot h[3] + g[0] \cdot g^*[2] + g^*[1] \cdot g[3]) \end{pmatrix} \qquad [26]$$

$$c = 1 \qquad /*\theta = 0*/$$

else $$c = -1 \quad /*\theta = \tfrac{1}{2}\pi*/$$

where $\theta$ may be computed as disclosed in equation [24]. Thus, a single bit value of 1 may represent the condition c=1, whereas a single bit value of 0 may represent the condition c=−1.

In other exemplary embodiments of the invention, the rotation value, c, may be computed based on a weighted average as shown in the following relationship:

if $$\begin{pmatrix} \text{Re}(w_0 \cdot (h[0] \cdot h^*[2] + h^*[1] \cdot h[3]) + w_1 \cdot (g[0] \cdot g^*[2] + g^*[1] \cdot g[3])) > \\ \text{Im}(w_0 \cdot (h[0] \cdot h^*[2] + h^*[1] \cdot h[3]) + w_1 \cdot (g[0] \cdot g^*[2] + g^*[1] \cdot g[3])) \end{pmatrix} \qquad [27]$$

$$c = 1 \qquad /*\theta = 0*/$$

else $$c = -1 \quad /*\theta = \tfrac{1}{2}\pi*/$$

where $w_0$ and $w_1$ represent weighting factors. In an exemplary embodiment of the invention, the weighting factors may be computed as shown below:

$$w_0 = \sum_{i=0}^{3} |h[i]|^2 \qquad [28]$$

$$w_1 = \sum_{i=0}^{3} |g[i]|^2$$

In various exemplary embodiments of the invention as represented in FIG. 5 and/or FIG. 6, the rotation value, c, may be represented as a two-bit value. For example, with reference to the exemplary embodiments shown in FIG. 6:

$$\text{if} \left\{ \begin{pmatrix} \text{Re } |h[0] \cdot h^*[2] + h^*[1] \cdot h[3] + g[0] \cdot g^*[2] + g^*[1] \cdot g[3]| > \\ \text{Im } |h[0] \cdot h^*[2] + h^*[1] \cdot h[3] + g[0] \cdot g^*[2] + g^*[1] \cdot g[3]| \\ \& \text{ Re } (h[0] \cdot h^*[2] + h^*[1] \cdot h[3] + g[0] \cdot g^*[2] + g^*[1] \cdot g[3]) > 0 \end{pmatrix} \right\} \quad [29]$$

$$c = 1 \qquad /* \theta = 0 */$$

$$\text{elseif} \left\{ \begin{pmatrix} \text{Re } |h[0] \cdot h^*[2] + h^*[1] \cdot h[3] + g[0] \cdot g^*[2] + g^*[1] \cdot g[3]| > \\ \text{Im } |h[0] \cdot h^*[2] + h^*[1] \cdot h[3] + g[0] \cdot g^*[2] + g^*[1] \cdot g[3]| \\ \& \text{ Re } (h[0] \cdot h^*[2] + h^*[1] \cdot h[3] + g[0] \cdot g^*[2] + g^*[1] \cdot g[3]) < 0 \end{pmatrix} \right\}$$

$$c = -1 \qquad /* \theta = \frac{1}{2}\pi */$$

$$\text{elseif} \left\{ \begin{pmatrix} \text{Re } |h[0] \cdot h^*[2] + h^*[1] \cdot h[3] + g[0] \cdot g^*[2] + g^*[1] \cdot g[3]| < \\ \text{Im } |h[0] \cdot h^*[2] + h^*[1] \cdot h[3] + g[0] \cdot g^*[2] + g^*[1] \cdot g[3]| \\ \& \text{ Im } (h[0] \cdot h^*[2] + h^*[1] \cdot h[3] + g[0] \cdot g^*[2] + g^*[1] \cdot g[3]) > 0 \end{pmatrix} \right\}$$

$$c = j \qquad /* \theta = \frac{1}{4}\pi */$$

$$\text{elseif} \left\{ \begin{pmatrix} \text{Re } |h[0] \cdot h^*[2] + h^*[1] \cdot h[3] + g[0] \cdot g^*[2] + g^*[1] \cdot g[3]| < \\ \text{Im } |h[0] \cdot h^*[2] + h^*[1] \cdot h[3] + g[0] \cdot g^*[2] + g^*[1] \cdot g[3]| \\ \& \text{ Im } (h[0] \cdot h^*[2] + h^*[1] \cdot h[3] + g[0] \cdot g^*[2] + g^*[1] \cdot g[3]) < 0 \end{pmatrix} \right\}$$

$$c = -j \qquad /* \theta = -\frac{1}{4}\pi */$$

where $j = \sqrt{-1}$.

In various embodiments of the invention, the rotation value, c, as shown in equation [29] may also be computed when utilizing weighting factors as shown in equation [28], for example. Various embodiments of the invention may be practiced when the rotation value, c, is represented as a binary value comprising three or more bits. In various embodiments of the invention, the computed rotation value, c, may be computed at a receiving station 422 or 622, and transmitted to the receiving station 402 as shown in FIG. 4.

Various embodiments of the invention may also be practiced in a transmitting station 402, which utilizes a plurality of SFBC encoders or STBC encoders. Various embodiments of the invention may also be practiced in an SFBC or STBC diversity communication system in a transmitting station 402, which utilizes one or more SFBC encoders or STBC encoders and/or in a receiving station 422, which utilizes a single SFBC decoder or STBC decoder, which receives signals from a plurality of receiving antennas as specified by the variable $N_{RX}$.

For example, in an exemplary SFBC diversity receiver that utilizes $N_{RX}$ receiving antennas, as the value of $N_{RX}$ increases to reflect the increasing number of receiving antennas, the number of channels increases. For example, as shown in equation [20] for $N_{RX}=2$, two sets of channels h[0],h[1],h[2], h[3] and g[0],g[1],g[2],g[3] are utilized by the receiving station 422 to receive signals transmitted by the transmitting station 402. For $N_{RX}=3$, a third set of channels, m[0],m[1],m [2],m[3] may be utilized in addition to the channel sets h[i] and g[i]. The matrix elements in the matrix $\overline{H}$ based on the set of channels m[0],m[1],m[2],m[3] may follow the pattern for the channels h[i] and g[i] as shown in equation [20]. Consequently, for a given value $N_{RX}$ the matrix $\overline{H}_{sq}(N_{RX})$ may be represented as a function of the value $N_{RX}$ and may comprise $4 \times N_{RX}$ rows and 4 columns.

The SFBC decoder 604, which receives the signals from the $N_{RX}$ receiving antennas, may compute a single rotation factor value c. The rotation factor value may be computed by generating a square matrix, $\overline{H}_{sq}(N_{RX})$, based on a matrix product of the matrix $\overline{H}_{sq}(N_{RX})$ and the Hermitian matrix $\overline{H}^H(N_{RX})$, as substantially as shown in equation [22]. The signal rotation factor value, c, may be computed such that the off-diagonal elements in the matrix $\overline{H}_{sq}(N_{RX})$ are approximately equal to zero.

Figure 7:
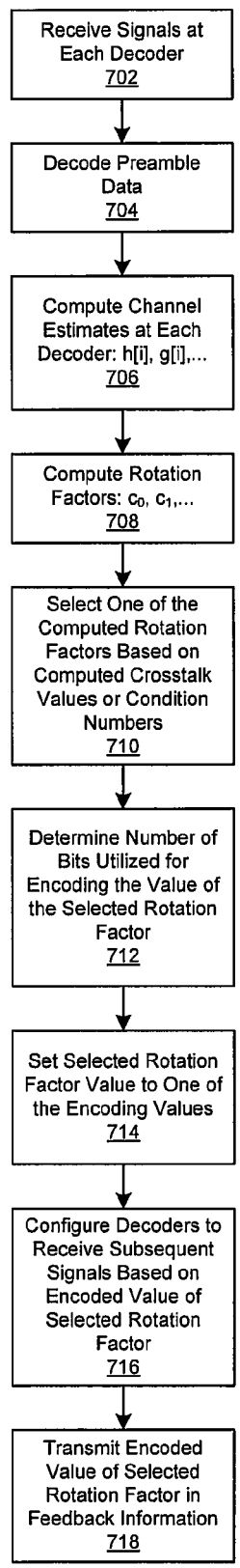
FIG. 7 is a flowchart illustrating exemplary steps for selecting a rotation factor in a multiple decoder receiver, in accordance with an embodiment of the invention.

FIG. 7 is a flowchart illustrating exemplary steps for selecting a rotation factor in a multiple decoder receiver, in accordance with an embodiment of the invention. Referring to FIG. 7, in step 702, each decoder 504a and 504b in a receiving station 422 may receive a signal y(0) and y(1) respectively. In step 704, the decoders 504a and 504b may decode preamble data contained in the received signals. In step 706, each decoder may compute channel estimates, h[i], g[i], . . . , based on the preamble data received at each corresponding decoder. In step 708, each decoder may compute a rotation factor, $c_0$, $c_1$, . . . In step 710, the receiving station 422 may select one of the computed rotation factors. The criteria for selected a rotation factor may be based on a comparison of computed crosstalk values, as shown in equations [18] and [19], or based on a comparison of condition numbers.

In step 712, a number of bits may be determined for encoding the value of the selected rotation factor. In step 714, the value for the selected rotation factor may be set to one of the encoding values. Exemplary encoding values based on the number of bits utilized are shown in equations [26], [27] and [29]. In step 716, the decoders 504a and 504b may be configured to utilize the encoded value of the selected rotation factor when receiving subsequent signals. In step 718, the encoded value of the selected rotation factor maybe transmitted to the transmitted station 402 in feedback information.

Figure 8:
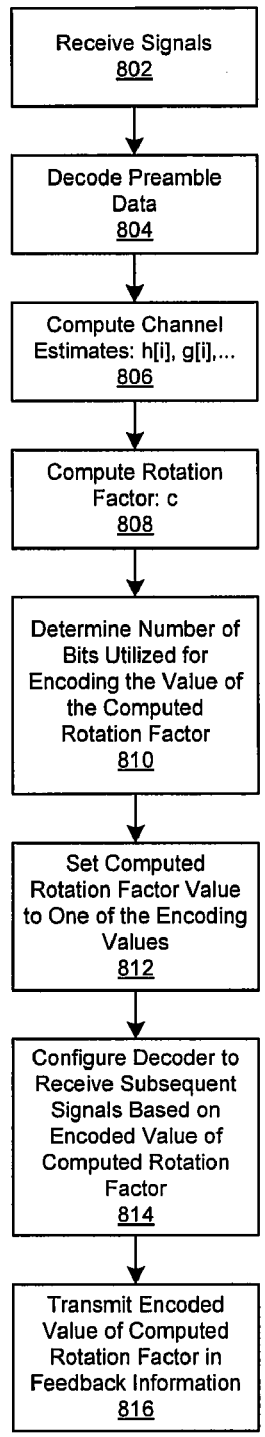
FIG. 8 is a flowchart illustrating exemplary steps for selecting a rotation factor in a single decoder receiver, in accordance with an embodiment of the invention.

FIG. 8 is a flowchart illustrating exemplary steps for selecting a rotation factor in a single decoder receiver, in accordance with an embodiment of the invention. Referring to FIG. 8, in step 802, each the decoder 604 in a receiving station 622 may receive a signal y(0) and y(1) respectively. In step 804, the decoder 604 may decode preamble data contained in the received signals. In step 806, the decoder may compute channel estimates, h[i], g[i], . . . , based on the preamble data received at the decoder 604. In step 808, the decoder may compute a rotation factor, c.

In step 810, a number of bits may be determined for encoding the value of the computed rotation factor. In step 812, the value for the computed rotation factor may be set to one of the encoding values. In step 814, the decoder 604 may be configured to utilize the encoded value of the selected rotation factor when receiving subsequent signals. In step 816, the encoded value of the selected rotation factor maybe transmitted to the transmitted station 402 in feedback information.

Aspects of a system for STBC/SFBC in a communication system utilizing 4 transmitting antennas and 2 receiving antennas may comprise a receiver 300b, which enables reception of signals via a plurality of receiving antennas. The receiver 300b may enable computation of a rotation factor value based on the received signals and utilization of the computed rotation factor value to receive subsequent signals via the plurality of receiving antennas. The received signals may comprise preamble data. The receiver 300b may enable computation of channel estimate values based on the received preamble data. A rotation angle value may be computed based on the computed channel estimate values. The rotation factor value may be computed based on the computed rotation angle value. The receiver 300b may enable transmission of feedback information comprising the computed rotation factor and/or the computed rotation angle. Specifically, a transceiver system 200 comprising the receiver 300b may utilize a transmitter 204 to transmit the feedback information via a wireless communication medium 444.

The receiver 300b may enable generation of a transfer function matrix based on the computed channel estimate values. A square matrix may be generated by pre-multiplying the transfer function matrix by a transformed version of the transfer function matrix. In various embodiments of the invention, the transformed version is a Hermitian transform of the transfer function matrix. The off-diagonal elements in the square matrix may comprise crosstalk terms. The receiver 300b may enable computation of the rotation factor value such that the value of each of the crosstalk terms is approximately equal to zero.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Aspects of a machine-readable storage having stored thereon, a computer program having at least one code section for processing signals in a communication system, the at least one code section being executable by a machine for causing the machine to perform steps comprising receiving signals via a plurality of receiving antennas, computing a rotation factor based on the received signals and utilizing the computed rotation factor to receive subsequent signals via the plurality of receiving antennas.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system comprising:
   receiving signals via a plurality of receiving antennas, in which a respective decoder of a plurality of decoders is utilized to decode signals received at a respective receiving antenna;
   decoding in each decoder to calculate respective channel estimation for signals received at a respective receiving antenna for that decoder, wherein the channel estimation is calculated based on preamble data in the signals and a transfer function matrix is generated in each decoder to calculate the respective channel estimation and a square matrix;
   computing a complex-valued rotation factor in each decoder to minimize crosstalk in respect to the calculated channel estimation for that decoder;
   selecting one of the complex-valued rotation factors which produces a least amount of crosstalk based on a preselected computation; and
   transmitting the selected complex-valued rotation factor to a transmitter that transmitted the signals to utilize the selected complex-valued rotation factor for subsequent signals sent to the receiving antennas.

2. The method according to claim 1, comprising using a Hermitian matrix in each decoder to calculate the channel estimation.

3. The method according to claim 1, comprising computing each complex-valued rotation factor based on a corresponding rotation angle.

4. The method according to claim 3, comprising transmitting the rotation angle corresponding to the selected complex-valued rotation factor.

5. The method according to claim 1, comprising generating the square matrix by pre-multiplying the transfer function matrix by a transformed version of the transfer function matrix.

6. The method according to claim 5, wherein off-diagonal elements in the square matrix comprise crosstalk terms.

7. The method according to claim 6, wherein the crosstalk is derived from the crosstalk terms in the square matrix.

8. A system for processing signals comprising:
   one or more circuits that enable reception of signals via a plurality of receiving antennas, wherein the one or more circuits include a plurality of decoders, in which a respective decoder of the plurality of decoders is utilized to decode signals received at a respective receiving antenna;
   each decoder to calculate respective channel estimation for signals received at a respective receiving antenna for that decoder, wherein the channel estimation is calculated based on preamble data in the signals and wherein each decoder to generate a transfer function matrix to calculate the respective channel estimation and a square matrix, and each decoder to compute a complex-valued rotation factor to minimize crosstalk in respect to the calculated channel estimation for that decoder;

the one or more circuits to select one of the complex-valued rotation factors which produces a least amount of crosstalk based on a preselected computation; and the one or more circuits to transmit the selected complex-valued rotation factor to a transmitter that transmitted the signals to utilize the selected complex valued rotation factor for subsequent signals sent to the receiving antennas.

9. The system according to claim 8, wherein each decoder to use a Hermitian matrix to calculate the channel estimation.

10. The system according to claim 8, wherein computation of each complex-valued rotation factor is based on a corresponding rotation angle.

11. The system according to claim 10, wherein the one or more circuits to transmit the rotation angle corresponding to the selected complex-valued rotation factor.

12. The system according to claim 8, wherein each decoder to generate the square matrix by pre-multiplying the transfer function matrix by a transformed version of the transfer function matrix.

13. The system according to claim 12, wherein off diagonal elements in the square matrix comprise crosstalk terms.

14. The system according to claim 13, wherein the crosstalk is derived from the crosstalk terms in the square matrix.

15. An apparatus comprising:
one or more radio front end that enable reception of wireless signals via a plurality of receiving antennas;
a plurality of decoders coupled to the one or more radio front end, in which a respective decoder of the plurality of decoders is utilized to decode signals received at a respective receiving antenna, each decoder to calculate respective channel estimation for signals received at a respective receiving antenna for that decoder, wherein the channel estimation is calculated based on preamble data in the signals and wherein each decoder to generate a transfer function matrix to calculate the respective channel estimation and a square matrix, and each decoder to compute a complex-valued rotation factor to minimize crosstalk in respect to the calculated channel estimation for that decoder; and a processor to select one of the complex-valued rotation factors which produces a least amount of crosstalk based on a preselected computation, in which the selected complex-valued rotation factor is to be transmitted by the one or more radio front end to a transmitter that transmitted the signals to utilize the selected complex valued rotation factor for subsequent signals sent to the receiving antennas.

16. The apparatus according to claim 15, wherein each decoder to use a Hermitian matrix to calculate the channel estimation.

17. The apparatus according to claim 15, wherein computation of each complex-valued rotation factor is based on a corresponding rotation angle.

18. The apparatus according to claim 17, wherein the one or more circuits to transmit the rotation angle corresponding to the selected complex-valued rotation factor.

19. The apparatus according to claim 15, wherein each decoder to generate the square matrix by pre-multiplying the transfer function matrix by a transformed version of the transfer function matrix and wherein off diagonal elements in the square matrix comprise crosstalk terms.

20. The apparatus according to claim 19, wherein the crosstalk is derived from the crosstalk terms in the square matrix.

* * * * *